US008020195B2

(12) United States Patent
Frost et al.

(10) Patent No.: US 8,020,195 B2
(45) Date of Patent: *Sep. 13, 2011

(54) SYSTEMS AND METHODS FOR USER LOGIN (75) Inventors: Simon Frost, Harpenden (GB); David Williams, Cambridgeshire (GB)

(73) Assignee: Citrix Systems, Inc., Fort Lauderdale, FL (US)

( * ) Notice: Subject to any disclaimer, the term of this patent is extended or adjusted under 35 U.S.C. 154(b) by 916 days.

This patent is subject to a terminal disclaimer.

(21) Appl. No.: 11/693,991

(22) Filed: Mar. 30, 2007

(65) Prior Publication Data

US 2008/0244718 A1    Oct. 2, 2008

(51) Int. Cl.
G06F 7/04 (2006.01)

(52) U.S. Cl. ............. 726/3; 726/2; 726/4; 726/5; 726/6; 726/8; 713/155; 713/168; 713/182; 713/185; 709/227; 709/228; 709/229

(58) Field of Classification Search ................... 726/2, 4, 726/5, 6, 8, 3; 713/155, 168, 182, 185; 709/227, 709/228, 229
See application file for complete search history.

(56) References Cited

U.S. PATENT DOCUMENTS

| | | | | |
|---|---|---|---|---|
| 5,875,296 A * | 2/1999 | Shi et al. | ............................ | 726/5 |
| 5,923,842 A * | 7/1999 | Pedersen et al. | .................. | 726/8 |
| 7,340,772 B2 * | 3/2008 | Panasyuk et al. | ............... | 726/15 |
| 7,356,694 B2 * | 4/2008 | Mayo et al. | .................... | 713/159 |
| 7,454,622 B2 * | 11/2008 | Laidlaw et al. | ............... | 713/182 |
| 7,496,954 B1 * | 2/2009 | Himawan et al. | ................. | 726/8 |
| 7,502,726 B2 * | 3/2009 | Panasyuk et al. | ................. | 726/8 |
| 7,594,018 B2 * | 9/2009 | Pedersen | ...................... | 709/227 |
| 7,702,794 B1 * | 4/2010 | Hall et al. | ..................... | 709/227 |
| 7,823,192 B1 * | 10/2010 | Fultz et al. | ........................ | 726/5 |
| 7,917,638 B1 * | 3/2011 | Appelman et al. | ........... | 709/229 |
| 2002/0019764 A1 * | 2/2002 | Mascarenhas | .................. | 705/10 |
| 2002/0035699 A1 * | 3/2002 | Crosbie | ......................... | 713/201 |
| 2002/0116531 A1 * | 8/2002 | Chu | ............................. | 709/246 |
| 2003/0084165 A1 * | 5/2003 | Kjellberg et al. | ............. | 709/227 |
| 2003/0163569 A1 * | 8/2003 | Panasyuk et al. | ............. | 709/227 |
| 2004/0078604 A1 * | 4/2004 | Rice et al. | ..................... | 713/202 |
| 2004/0122961 A1 * | 6/2004 | Rouault | ........................ | 709/229 |
| 2005/0080906 A1 * | 4/2005 | Pedersen | ....................... | 709/228 |
| 2005/0108521 A1 * | 5/2005 | Silhavy et al. | ................ | 713/156 |
| 2005/0188095 A1 * | 8/2005 | Gardiner et al. | ............. | 709/230 |
| 2005/0198397 A1 * | 9/2005 | Park | ............................ | 709/248 |
| 2005/0246445 A1 * | 11/2005 | Panasyuk et al. | ............. | 709/227 |

(Continued)

FOREIGN PATENT DOCUMENTS

EP    1303102    4/2003

OTHER PUBLICATIONS

International Search Report for PCT/US2008/058593 dated Oct. 7, 2008.

(Continued)

Primary Examiner — Nasser Moazzami
Assistant Examiner — Shanto M Abedin
(74) Attorney, Agent, or Firm — Foley & Lardner LLP; John D. Lanza (57) ABSTRACT Systems and methods for login a user into a computing system are shown and described. The method can include receiving a request for an anonymous user login, creating an identifying tag responsive to the received request, creating a user account incorporating the identifying tag, and providing to the computing system the created user account to log into the computing system.

18 Claims, 4 Drawing Sheets

U.S. PATENT DOCUMENTS

| | | | |
|---|---|---|---|
| 2006/0039355 A1* | 2/2006 | Rao et al. | 370/352 |
| 2006/0095788 A1* | 5/2006 | Bronstein et al. | 713/185 |
| 2006/0143695 A1* | 6/2006 | Grynberg | 726/4 |
| 2006/0225130 A1* | 10/2006 | Chen et al. | 726/5 |
| 2007/0130167 A1* | 6/2007 | Day et al. | 707/10 |

OTHER PUBLICATIONS

Written Opinion of the International Searching Authority for PCT/US2008/058593 dated Oct. 7, 2008.

* cited by examiner

SYSTEMS AND METHODS FOR USER LOGIN

FIELD OF THE INVENTION

This application generally relates to logging into a computing system. In particular, this application relates to systems and methods for proving anonymous users the ability to log into a computing system.

BACKGROUND OF THE INVENTION

Anonymous user accounts on computing systems currently provide a useful mechanism for an organization to deploy applications to users where the identities of the users are separate to that available to the Windows Domain hosting a server. A user can request an application session without supplying credentials that correspond to a user within the scope of the current server.

There are a number of drawbacks associated with anonymous user accounts. One drawback is that a session associated with an anonymous account typically is not reconnectable because a reliable association between the session and real user is absent. Another drawback is that helpdesk employees, system administrators, and other information technology staff find it difficult determine which anonymous user is associated with a session.

SUMMARY OF THE INVENTION

In one aspect, the application features a method for providing a login to a computing system. The method includes receiving a request for an anonymous user login, creating an identifying tag responsive to the received request, creating a user account incorporating the identifying tag, and providing to the computing system the created user account to log into the computing system.

In one embodiment, creating an identifying tag comprises creating the identifying tag by a server. In another embodiment, creating an identifying tag comprises creating the identifying tag by a client. In other embodiments, creating an identifying tag comprises retrieving data from a client device. In some embodiments, creating an identifying tag comprises creating an identifying tag having an alphanumeric string. In other embodiments, the method includes validating a name of the created user account. In further embodiments, the method includes validating the identifying tag. In some embodiments, the method includes determining that the identifying tag is not valid and associating in response to the determination the identifying tag with a generic tag.

In one embodiment, the method includes, after login, associating the user account with a session executing on the computing system. In some embodiments, the method includes disconnecting from the session associated with a user account, and maintaining on the computing system state information related to the disconnected session. In other embodiments, the method includes reconnecting the anonymous user to the disconnected session previously associated with a user account, when a substantially similar identifying tag is created and provided to anonymously log into the computing system.

In another aspect, the application features a computer readable medium having instructions thereon that when executed provide a login to a computing system. The computer readable medium includes instructions to receive a request for an anonymous user login, instructions to create an identifying tag responsive to the received request, and instructions to create a user account incorporating the identifying tag. The computer readable medium also includes instructions to provide the created user account to log into the computing system. In some embodiments, the computer readable medium includes instructions to validate the identifying tag. In other embodiments, the computer readable medium includes instructions to disconnect from the session, and instructions to maintain, on the computing system, state information related to the disconnected session. In another embodiment, the computer readable medium includes instructions to reconnect the anonymous user to the disconnected session previously associated with a user account, when a substantially similar identifying tag is created and provided to anonymously log into the computing system.

In still another aspect, the application feature a system for providing a login to a computing system. The system includes means for receiving a request for an anonymous user login, means for creating an identifying tag responsive to the received request, means for creating a user account incorporating the identifying tag, and means for providing the created user account to log into the server.

In one embodiment, the means for creating an identifying tag responsive to the received request comprises a means for creating an alphanumeric string. In other embodiments, the means for creating an identifying tag responsive to the received request comprises a means for validating the tag. In further embodiments, the means for creating a user account incorporating the identifying tag comprises means for associating the user account with a session executing on the computing system.

In another embodiment, the system also includes a means for disconnecting from the session associated with a user and a means for maintaining state information related to the disconnected session. In other embodiments, the system includes a means for reconnecting the anonymous user to the disconnected session previously associated with the user account, when a substantially similar identifying tag is created and provided to anonymously log into the computer.

BRIEF DESCRIPTION OF THE DRAWINGS

The following figures depict certain illustrative embodiments of the invention in which like reference numerals refer to like elements. These depicted embodiments are to be understood as illustrative of the invention and not as limiting in any way.

DETAILED DESCRIPTION

Figure 1:
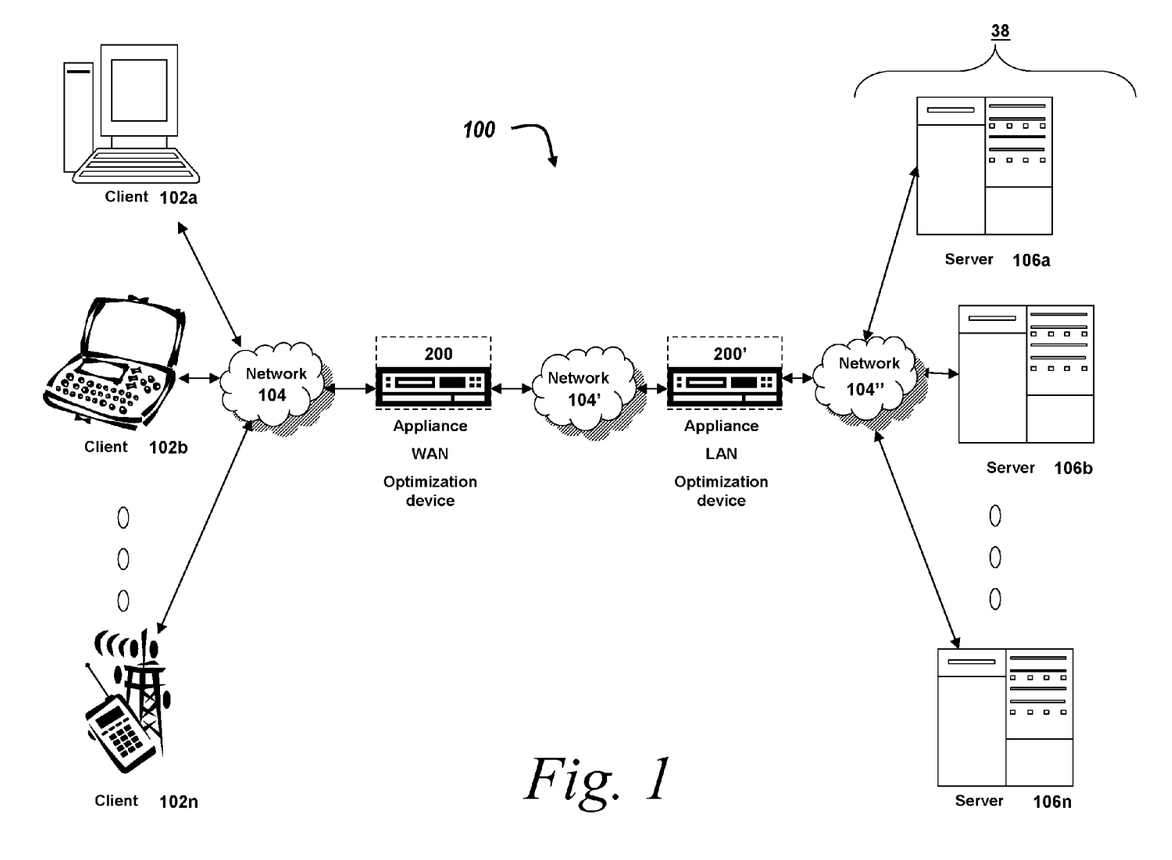
FIG. 1 is a block diagram of an embodiment of a network environment showing a client accessing a server via an appliance.

Prior to discussing the specifics of embodiments of the systems and methods for logging a user into a computing system, it may be helpful to discuss the network and computing environments in which such embodiments may be deployed. Referring now to FIG. 1, an embodiment of a network environment 100 is depicted. In brief overview, the network environment 100 has one or more clients 102a-102n (also generally referred to as local machine(s) 102, or client(s) 102) in communication with one or more servers 106a-106n (also generally referred to as server(s) 106, or remote machine(s) 106) via one or more networks 104, 104', 104". In some embodiments, a client 102 communicates with a server 106 via one or more network optimization appliances 200, 200' (generally referred to as appliance 200). In one embodiment, the network optimization appliance 200 is designed, configured or adapted to optimize Wide Area Network (WAN) network traffic. In some embodiments, a first appliance 200 works in conjunction or cooperation with a second appliance 200' to optimize network traffic. For example, a first appliance 200 may be located between a branch office and a WAN connection while the second appliance 200' is located between the WAN and a corporate Local Area Network (LAN). The appliances 200 and 200' may work together to optimize the WAN and LAN related network traffic between a client in the branch office and a server on the corporate LAN.

The client 102 can be any personal computer, server, Windows-based terminal, network computer, wireless device, information appliance, RISC Power PC, X-device, workstation, minicomputer, personal digital assistant (PDA), main frame computer, cellular telephone or other computing device that provides sufficient faculties to execute client software and an operating system. Client software executing on the client 102 provides functionality, alone or in combination with additional software, directed to logging into a computer system.

Still referring to FIG. 1, the network environment may include multiple, logically-grouped servers 106. In these embodiments, the logical group of servers may be referred to as a server farm 38. In some of these embodiments, the servers 106 may be geographically dispersed. In some cases, a farm 38 may be administered as a single entity. In other embodiments, the server farm 38 comprises a plurality of server farms 38. In one embodiment, the server farm executes one or more applications on behalf of one or more clients 102.

The servers 106 within each farm 38 can be heterogeneous. One or more of the servers 106 can operate according to one type of operating system platform (e.g., WINDOWS NT, manufactured by Microsoft Corp. of Redmond, Wash.), while one or more of the other servers 106 can operate on according to another type of operating system platform (e.g., Unix or Linux). The servers 106 of each farm 38 do not need to be physically proximate to another server 106 in the same farm 38. Thus, the group of servers 106 logically grouped as a farm 38 may be interconnected using a wide-area network (WAN) connection or metropolitan-area network (MAN) connection. For example, a farm 38 may include servers 106 physically located in different continents or different regions of a continent, country, state, city, campus, or room. Data transmission speeds between servers 106 in the farm 38 can be increased if the servers 106 are connected using a local-area network (LAN) connection or some form of direct connection.

Servers 106 may be file servers, application servers, web servers, proxy servers, and/or gateway servers. In some embodiments, a server 106 may have the capacity to function as either an application server or as a master application server. In one embodiment, a server 106 may include an Active Directory. The clients 102 may also be referred to as client nodes or endpoints. In some embodiments, a client 102 has the capacity to function as both a client node seeking access to applications on a server and as an application server providing access to hosted applications for other clients 102a-102n.

In one embodiment, a server 106 provides functionality of a web server. In another embodiment, the server 106a receives requests from the client 102, forwards the requests to a second server 106b and responds to the request by the client 102 with a response to the request from the server 106b. In still another embodiment, the server 106 acquires an enumeration of applications available to the client 102 and address information associated with a server 106 hosting an application identified by the enumeration of applications. In yet another embodiment, the server 106 presents the response to the request to the client 102 using a web interface. In one embodiment, the client 102 communicates directly with the server 106 to access the identified application. In another embodiment, the client 102 receives application output data, such as display data, generated by an execution of the identified application on the server 106.

In some embodiments, the server 106 comprises any portion of the Citrix Access Suite™ by Citrix Systems, Inc., such as the MetaFrame or Citrix Presentation Server™ and/or any of the Microsoft® Windows Terminal Services manufactured by the Microsoft Corporation. In one embodiment, the server 106 may deliver one or more applications to clients 102 or users via a remote-display protocol or otherwise via remote-based or server-based computing.

Although FIG. 1 shows a network 104, network 104' and network 104" (generally referred to as network(s) 104) between the clients 102 and the servers 106, the clients 102 and the servers 106 may be on the same network 104. The networks 104, 104', 104" can be the same type of network or different types of networks. The network 104 can be a local-area network (LAN), such as a company Intranet, a metropolitan area network (MAN), or a wide area network (WAN), such as the Internet or the World Wide Web. The networks 104, 104', 104" can be a private or public network. In one embodiment, network 104' or network 104" may be a private network and network 104 may be a public network. In some embodiments, network 104 may be a private network and network 104' and/or network 104" a public network. In another embodiment, networks 104, 104', 104" may be private networks. In some embodiments, clients 102 may be located at a branch office of a corporate enterprise communicating via a WAN connection over the network 104 to the servers 106 located on a corporate LAN in a corporate data center.

In some embodiments, a client 102 communicates with a server 106. In one embodiment, the client 102 communicates directly with one of the servers 106 in a farm 38. In another embodiment, the client 102 executes a program neighborhood application to communicate with a server 106 in a farm 38. In still another embodiment, the server 106 provides the functionality of a master node. In some embodiments, the client 102 communicates with the server 106 in the farm 38 through a network 104. Over the network 104, the client 102 can, for example, request execution of various applications hosted by the servers 106a-106n in the farm 38 and receive output of the results of the application execution for display. In some embodiments, only the master node provides the functionality required to identify and provide address information associated with a server 106' hosting a requested application.

The network 104 may be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 may be a bus, star, or ring network topology.

The network 104 and network topology may be of any such network or network topology as known to those ordinarily skilled in the art capable of supporting the operations described herein.

In other embodiments, the clients 102 and servers 106 communicate through a network 140. The protocols used to communicate can include any variety of protocols used for long haul or short transmission. For example, TCP/IP, IPX, SPX, NetBIOS, NetBEUI, SONET and SDH protocols or any type and form of transport control protocol may also be used, such as a modified transport control protocol, for example a Transaction TCP (T/TCP), TCP with selection acknowledgements (TCPSACK), TCP with large windows (TCP-LW), a congestion prediction protocol such as the TCP-Vegas protocol, and a TCP spoofing protocol. In other embodiments, any type and form of user datagram protocol (UDP), such as UDP over IP, may be used.

As depicted in FIG. 1, a first network optimization appliance 200 is shown between networks 104 and 104' and a second network optimization appliance 200' is also between networks 104' and 104". In some embodiments, the appliance 200 may be located on network 104. For example, a corporate enterprise may deploy an appliance 200 at the branch office. In other embodiments, the appliance 200 may be located on network 104'. In some embodiments, the appliance 200' may be located on network 104' or network 104". For example, an appliance 200 may be located at a corporate data center. In one embodiment, the appliance 200 and 200' are on the same network. In another embodiment, the appliance 200 and 200' are on different networks.

In one embodiment, the appliance 200 is a device for accelerating, optimizing or otherwise improving the performance, operation, or quality of service of any type and form of network traffic. In some embodiments, the appliance 200 is a performance enhancing proxy. In other embodiments, the appliance 200 is any type and form of WAN optimization or acceleration device, sometimes also referred to as a WAN optimization controller. In one embodiment, the appliance 200 is any of the product embodiments referred to as WAN-Scaler manufactured by Citrix Systems, Inc. of Ft. Lauderdale, Fla. In other embodiments, the appliance 200 includes any of the product embodiments referred to as BIG-IP link controller and WANjet manufactured by F5 Networks, Inc. of Seattle, Wash. In another embodiment, the appliance 200 includes any of the WX and WXC WAN acceleration device platforms manufactured by Juniper Networks, Inc. of Sunnyvale, Calif. In some embodiments, the appliance 200 includes any of the steelhead line of WAN optimization appliances manufactured by Riverbed Technology of San Francisco, Calif. In other embodiments, the appliance 200 includes any of the WAN related devices manufactured by Expand Networks Inc. of Roseland, N.J. In one embodiment, the appliance 200 includes any of the WAN related appliances manufactured by Packeteer Inc. of Cupertino, Calif., such as the PacketShaper, iShared, and SkyX product embodiments provided by Packeteer. In yet another embodiment, the appliance 200 includes any WAN related appliances and/or software manufactured by Cisco Systems, Inc. of San Jose, Calif., such as the Cisco Wide Area Network Application Services software and network modules, and Wide Area Network engine appliances.

In some embodiments, the appliance 200 comprises any of the network devices manufactured by Citrix Systems, Inc. of Ft. Lauderdale Fla., referred to as Citrix NetScaler devices. In other embodiments, the appliance 200 includes any of the product embodiments referred to as WebAccelerator and BigIP manufactured by F5 Networks, Inc. of Seattle, Wash. In another embodiment, the appliance 200 includes any of the DX acceleration device platforms and/or the SSL VPN series of devices, such as SA 700, SA 2000, SA 4000, and SA 6000 devices manufactured by Juniper Networks, Inc. of Sunnyvale, Calif. In yet another embodiment, the appliance 200 includes any application acceleration and/or security related appliances and/or software manufactured by Cisco Systems, Inc. of San Jose, Calif., such as the Cisco ACE Application Control Engine Module service software and network modules, and Cisco AVS Series Application Velocity System.

In some embodiments, the appliance 200 provides application and data acceleration services for branch-office or remote offices. In one embodiment, the appliance 200 includes optimization of Wide Area File Services (WAFS). In another embodiment, the appliance 200 accelerates the delivery of files, such as via the Common Internet File System (CIFS) protocol. In other embodiments, the appliance 200 provides caching in memory and/or storage to accelerate delivery of applications and data. In one embodiment, the appliance 200 provides compression of network traffic at any level of the network stack or at any protocol or network layer. In another embodiment, the appliance 200 provides transport layer protocol optimizations, flow control, performance enhancements or modifications and/or management to accelerate delivery of applications and data over a WAN/LAN connection. For example, in one embodiment, the appliance 200 provides Transport Control Protocol (TCP) optimizations. In other embodiments, the appliance 200 provides optimizations, flow control, performance enhancements or modifications and/or management for any session or application layer protocol.

In some embodiments, the appliance 200 provides one or more of the following acceleration techniques to communications between the client 102 and server 106: 1) compression, 2) decompression, 3) Transmission Control Protocol pooling, 4) Transmission Control Protocol multiplexing, 5) Transmission Control Protocol buffering, and 6) caching. In one embodiment, the appliance 200 relieves servers 106 of much of the processing load caused by repeatedly opening and closing transport layers connections to clients 102 by opening one or more transport layer connections with each server 106 and maintaining these connections to allow repeated data accesses by clients via the Internet. This technique is referred to herein as "connection pooling". Further details of the appliances 200 can be found in co-pending, commonly owned, U.S. patent application Ser. No. 11/684,930 "SYSTEMS AND METHODS FOR END-USER EXPERIENCE MONITORING" and U.S. patent application Ser. No. 11/685,156 "SYSTEMS AND METHODS FOR STOCHASTIC-BASED QUALITY OF SERVICE", the entire contents of which are incorporated herein.

Figure 2:
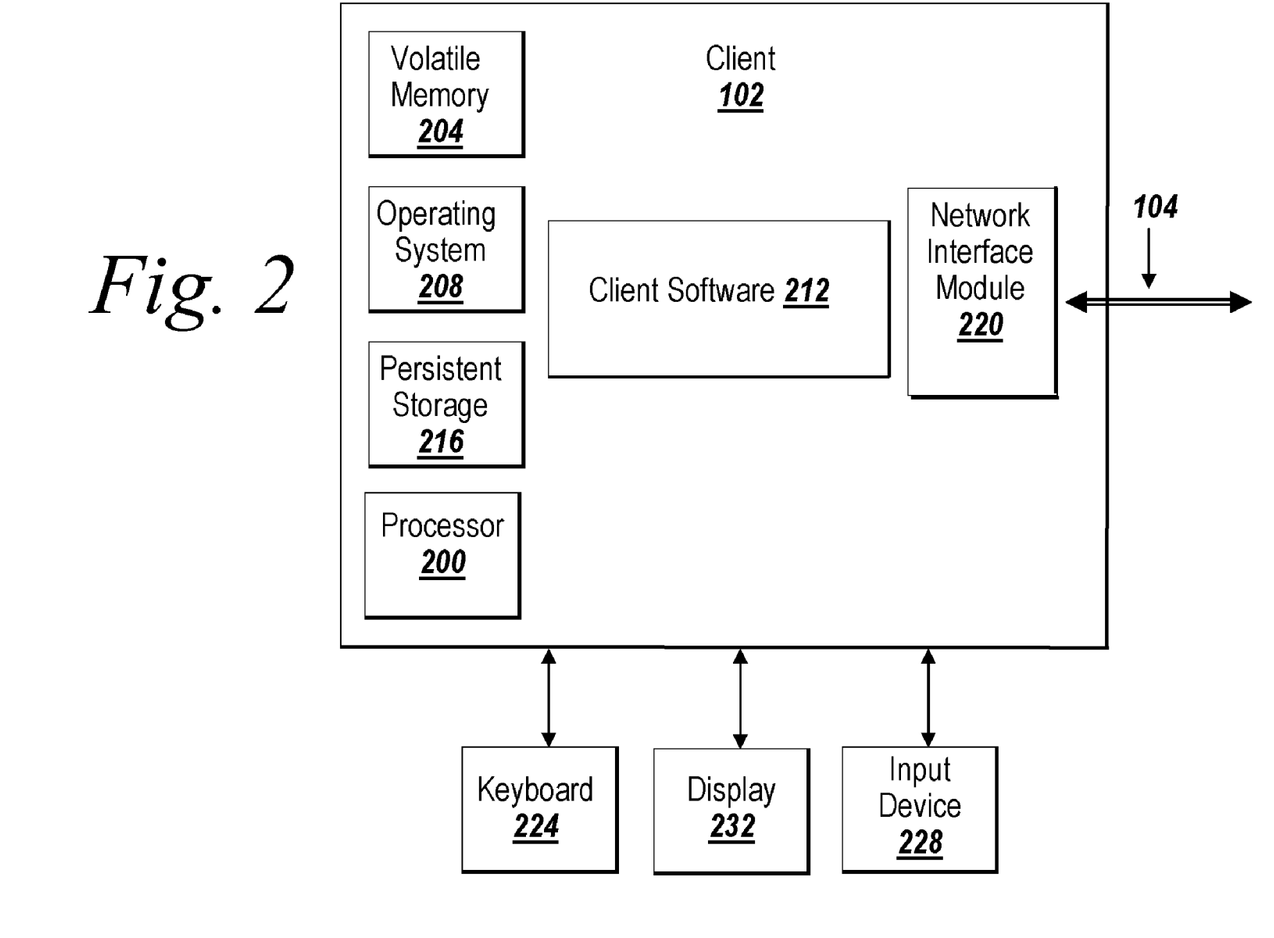
FIG. 2 is a block diagram of an embodiment of a client computing device of FIG. 1.

FIG. 2 depicts a conceptual block diagram of a client 102. It should be understood that other embodiments of the client 102 can include any combination of the following elements or include other elements not explicitly listed. In one embodiment, each client 102 typically includes a processor 200, volatile memory 204, an operating system 208, client software 212, a persistent storage memory 216 (e.g., hard drive or external hard drive), a network interface 220 (e.g., a network interface card), a keyboard 224 or virtualized keyboard in the case of a PDA, at least one input device 228 (e.g., a mouse, trackball, space ball, light pen and tablet, touch screen, stylus, a smartcard reader, and any other input device) in electrical communication with the client 102, and a display 232. The operating system 116 can include, without limitation, WINDOWS 3.x, WINDOWS 95, WINDOWS 98, WINDOWS NT 3.51, WINDOWS NT 4.0, WINDOWS 2000, WINDOWS XP, WINDOWS VISTA, WINDOWS CE, MAC/OS, JAVA, PALM OS, SYMBIAN OS, LINSPIRE, LINUX, SMARTPHONE OS, the various forms of UNIX, WINDOWS 2000 SERVER, WINDOWS 2000 ADVANCED SERVER, WINDOWS NT SERVER, WINDOWS NT SERVER ENTERPRISE EDITION, MACINTOSH OS X SERVER, UNIX, SOLARIS, and the like. In addition, the operating system 208 can run on a virtualized computing machine implemented in software using virtualization software such as VMWARE.

The client software 212 is in communication with various components (e.g., the operating system 208) of the client 102 to provide functionality described herein. As a general overview, the client software 212 can provide functionality directed to logging into a server 106 to gain access to one or more programs, files, directories, or other data stored on the server 106. The client software 212 may also provide functionality for creating all or part of an identifying tag for use in tracking and maintaining the user's session on the server 106. In other embodiments, the client software cooperates with server software to provide various functionality, described below in more detail. Further details on the client software 212 are discussed below.

Figure 3:
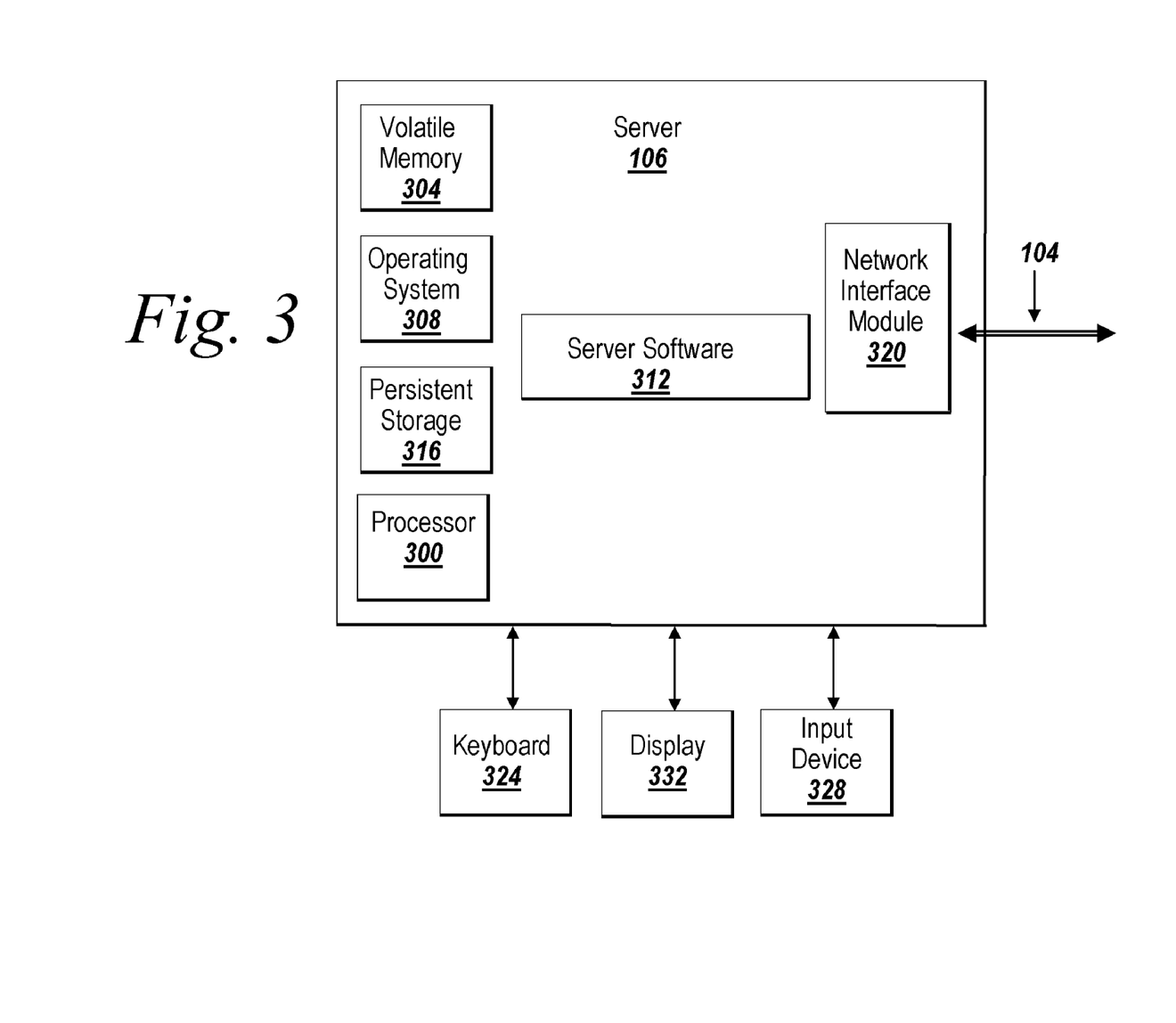
FIG. 3 is a block diagram of an embodiment of a server computing device of FIG. 1.

With reference to FIG. 3, an embodiment of a server 106 is described. It should be understood that other embodiments of the server 106 can include any combination of the following elements or include other elements not explicitly listed. The server 106 includes a processor 300, a volatile memory 304, an operating system 308, server software 312, persistent storage memory 316, a network interface 320, a keyboard 324, at least one input device 328 (e.g., a mouse, trackball, space ball, bar code reader, scanner, light pen and tablet, stylus, and any other input device), and a display 332. In another embodiment, the sever 106 operates in a "headless" mode. The server operating system can include, but is a not limited to, WINDOWS 3.x, WINDOWS 95, WINDOWS 98, WINDOWS NT 3.51, WINDOWS NT 4.0, WINDOWS 2000, WINDOWS XP, WINDOWS VISTA, WINDOWS CE, MAC/OS, JAVA, PALM OS, SYMBIAN OS, LINSPIRE, LINUX, SMARTPHONE OS, the various forms of UNIX, WINDOWS 2000 SERVER, WINDOWS 2000 ADVANCED SERVER, WINDOWS NT SERVER, WINDOWS NT SERVER ENTERPRISE EDITION, MACINTOSH OS X SERVER, UNIX, SOLARIS, and the like. In addition, the operating system 308 can run on a virtualized computing machine implemented in software using virtualization software such as VMWARE.

The server software 312 is in communication with various components (e.g., the operating system 308) of the server 106 to provide functionality described in more detail below. As a general overview, the server software 312 provides functionality directed to providing a login to a computing system. In certain embodiments, the server software 312 also provides functionality for creating all or part of an identifying tag. In other embodiments, the server software operates in cooperation with client and appliance software. Further details on the server software 312 are discussed below.

Figure 4:
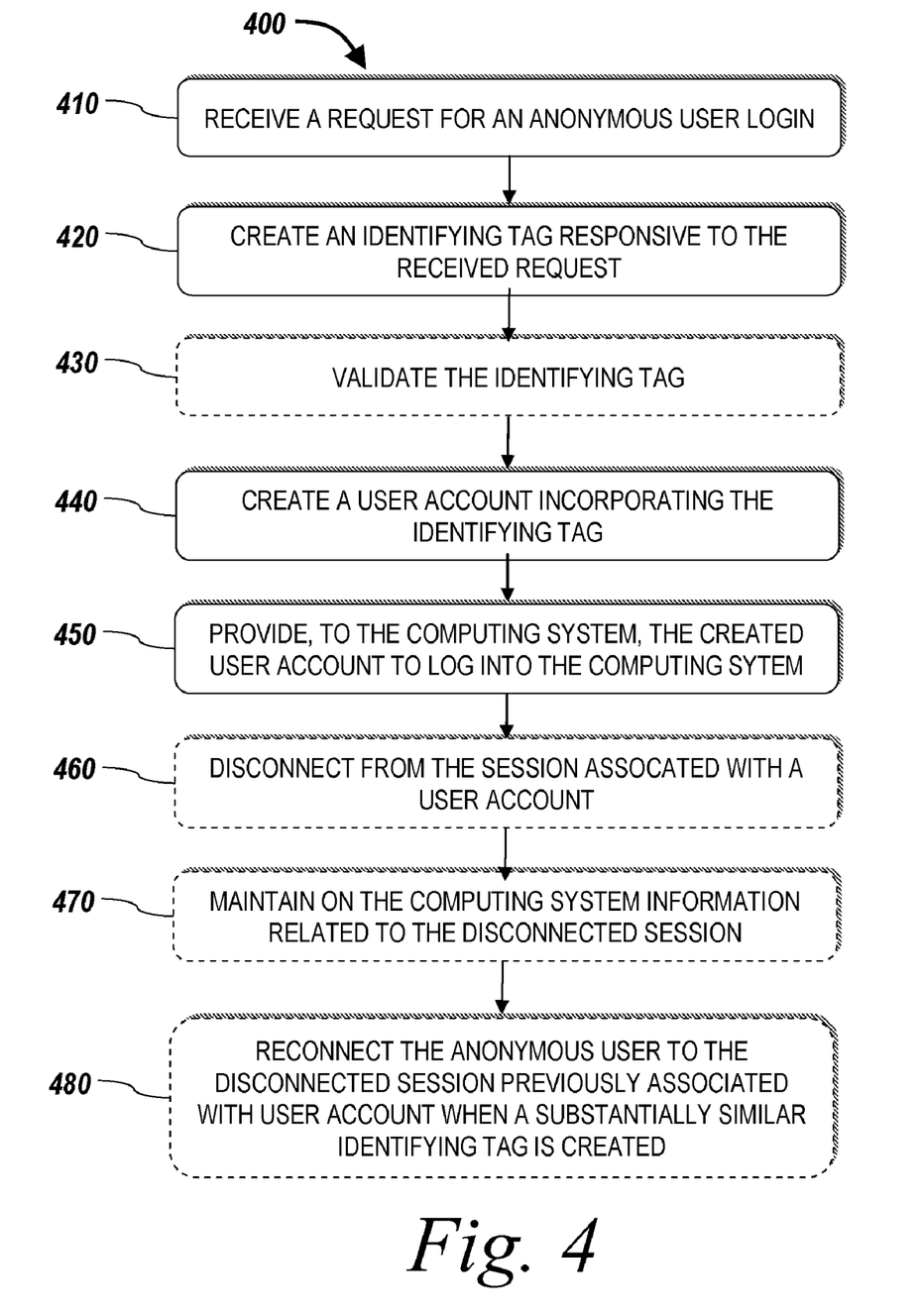
FIG. 4 is a flow chart of an embodiment of a method for providing a login to a computing system.

With reference to FIG. 4, an embodiment of a method 400 for providing a login to a computing system is shown and described. The method 400 includes receiving (step 410) a request for an anonymous user login and creating (step 420) an identifying tag in response to the received request. The method also includes creating (step 440) a user account that incorporates the identifying tag and providing (step 450) the created user account to log into the server 106. In some embodiments, the method 400 also includes validating (step 430) the identifying tag. In other embodiments, the method 400 also includes disconnecting (step 460) from the session associated with a user account, maintaining (step 470) on the computing system state information related to the disconnected session, and reconnecting (step 480) the anonymous user to the disconnected session previously associated with user account. The reconnection occurs when a substantially similar identifying tag is created and provided to anonymously log into the computing system.

In one embodiment, the computing system receives (step 410) a request for an anonymous user login. The computing system can be any of the above referenced servers 106, clients 102 or appliances 200. The request may be received at the server 106 via any kind of protocol, including, but not limited to TCP, IP, RCP, UDP, SNMP, modified TCP/IP or some other communications or network protocol. The computing system may receive the request directly from the client 102 or over a network 104.

In one embodiment, the method includes creating (step 420) an identifying tag in response to the received request. As used herein, tag refers to anything that can be a type of identifier that can be reliably associated with a user session. One characteristic of the reliability of the tag is that the tag can be provable or may be authenticated in some manner. In some embodiments, the client 102 creates the identifying tag. In other embodiments, an input device 228 creates all or part of the identifying tag. In still other embodiments, the server 106 receiving the request creates the identifying tag. In other embodiments, the user at the client 102 may input, via a keyboard 224 or some other input device 228, a user defined identifying tag. The identifying tag, in one embodiment is created at the server 106 that receives the request for an anonymous user login. In other embodiments, a different server 106' creates the identifying tag. For example, a server 106' executing Presentation Server by Citrix Systems, Inc. of Ft. Lauderdale, Fla., may create an identifying tag for an anonymous user attempting to connect to another server 106. An appliance 200 may also create all or part of an identifying tag.

In one embodiment, the identifying tag can be a character string or a number. In some embodiments, the identifying tag may be a string comprising a name or nickname. For example, an identifying tag can include a string of characters inputted by a user as a user-selected name. In other embodiments, the identifying tag may be a string comprising a URL. In some other embodiments, the identifying tag may be a string comprising either an IP or a MAC address. In some embodiments, the identifying tag may be a number. For example, in some embodiments, the identifying tag may be an identification number stored on a smartcard. In another example, in some embodiments, the identifying tag comprises a serial number stored in the client software 212. In another embodiment, the identifying tag may be comprised of a sequence number.

In a further embodiment, the method includes validating (step 430) the identifying tag. In some embodiments, the method includes validating the identifying tag by one or more of checking for prior use, for valid format, for valid type, for valid length, or for any other validity requirements. In some embodiments, the client 102 validates the identifying tag. In other embodiments, the server 106 validates the identifying tag. In some other embodiments, another network device, for example an appliance 200 or a different server 106', validates the identifying tag. In other embodiments, the validating device determines that the identifying tag is not valid and, in response to the determination of invalidity, associates the identifying tag with a generic name.

The method 400 also includes creating (step 440) a user account. In one embodiment, the server 106 creates (step 440) a user account that incorporates the identifying tag. In further embodiments, the server 106 may create the user account that incorporates the identifying tag for a domain or a group of servers 106. In other embodiments, a different computing device, e.g. a client 102 or an appliance 200, creates the user account. In some embodiments, the server 106 validates the user account that incorporates the identifying tag. In some embodiments, the server 106 validates for one or more of the following: prior use, valid format, valid type, valid length, or any other validity requirements. For example, in some embodiments, the server validates the user account that incorporates the identifying tag for prior existence. In some other embodiments, the server validates the user account incorporating the prior tag for prior existence on one or more other servers 106'.

In a further embodiment, the server 106 provides (step 450) the created user account for logging into the server 106. In some embodiments, the server 106 provides the created user account for logging into another server 106'. In other embodiments, the server 106 provides the created user account for logging into a domain. In some other embodiments, the server 106 provides the created user account for logging into a server farm 38. In one embodiment, the server 106 creates a user account that gives access to one or more applications. In some embodiments, the server 106 creates a user account that gives access to one or more of a file, a disk, a drive, or a file space location.

In some embodiments, the method 400 includes disconnecting (step 460) from the session associated with the user account. For example, in one embodiment, the server 106 may disconnect the user from the session upon expiration of a time limit. The server 106 may also disconnect the user for violation of a rule. In another example, in some embodiments, the user may disconnect the client 102 from the network. In some other embodiments, the client software 212 may send a request to the server 106, where the request comprises ending the session associated with a user account.

In other embodiments, the server 106 maintains (step 470) information related to the disconnected session. The information may include, in some embodiments, the identifying tag. In some other embodiments, the information maintained may include applications executing at the time of the session disconnection. In other embodiments, the information maintained includes a list of open files. In still other embodiments, the information maintained includes file transfer status information.

In another embodiment, the server 106 reconnects (step 480) the anonymous user to the disconnected session when the user and the session are associated to substantially similar identifying tags. Substantially similar tags can be created, for example, when a user tries to reconnect to the server 106 and supplies the same credentials, e.g. the same nickname, the same MAC address, smartcard id number or any other credentials. In some embodiments, the determination of substantial similarity is determined by a string comparison. In other embodiments, the determination of substantial similarity is determined by regular expression comparisons. In some other embodiments, the determination of substantial similarity is determined by numerical equivalence. The server 106 compares, in some embodiments, the contents of the anonymous user's identifying tag to the identifying tags associated with disconnected sessions that are still maintained on the server 106. In some embodiments, the server 106 compares the user's identifying tag to identifying tags associated with disconnected sessions on other servers 106'.

In some embodiments, reconnecting the anonymous user to the disconnected session includes reconnecting the user to the applications executing in the disconnected session. In some other embodiments, reconnecting the anonymous user to the disconnected session includes restoring one or more file transfers from the point at which the session disconnected.

The following example illustrates one use for the above-described systems and methods. A user may use a client device 102 with an input device 228 that is a smartcard reader. The user may attempt to connect, via the network, to a server 106 using an anonymous login. In this example, the client software 212 may use an identification number from the smartcard to create a string that is sent to the server 106 with the request for anonymous login. The string could be "12345678." The server 106 receives the request for login with the associated string. The server 106 may then create a tag using all or part of the string. It may create a tag in the format of Anon(tag). In this example, that format may create a user account labeled Anon(12345678) or Anon(123). The server may attempt to validate the tag. For example, it may check to make sure the tag has not already been used or that it is not null. If the tag is valid, then the server 106 creates a local account for the user and logs the user into the server 106. Upon disconnect, the server 106 stores the tag and information on the state of the session at the time of disconnect. The session information may be maintained on the server 106 for a certain amount of time before the server 106 determines that session is stale and removes the stored information. If the user makes a subsequent request for anonymous login to the same server 106 and user uses the same smartcard, the same identifying string would be sent to the server 106. The server can determine that the tag has been used before. If the server 106 determines that the session is not stale, the server 106 logs in the user again and reconnects the user with the previous session.

Using the techniques described above, certain advantages and features may be realized. Examples include, but are not limited to, associating identifying tags with anonymously logged in users allows information technology staff to track the users and their associated session. This will allow helpdesk staff to track users and troubleshoot with them. The identifying tags also allow servers 106 to reconnect anonymous users to previously disconnected sessions. The ability to reconnect anonymous users to previous sessions facilitates, for example, a system where anonymous users can test and demonstrate software.

The previously described embodiments may be implemented as a method, apparatus or article of manufacture using programming and/or engineering techniques to produce software, firmware, hardware, or any combination thereof. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.), a file server providing access to the programs via a network transmission line, wireless transmission media, signals propagating through space, radio waves, infrared signals, etc. The article of manufacture includes hardware logic as well as software or programmable code embedded in a computer readable medium that is executed by a processor. Of course, those skilled in the art will recognize that many modifications may be made to this configuration.

Although the systems and methods described above occur with reference to specific details, it is not intended that such details should be regarded as limitations upon the scope of the application, except as and to the extent that they are included in the accompanying claims.

What is claimed is:

1. A method for distinguishing between sessions associated with anonymous users, the method comprising:
receiving, by a server from a client, a first anonymous request for login by a user operating the client, the first request comprising an identification number;
creating, by the server in response to receiving the request, a first identifying tag comprising at least a part of the identification number;
validating, by the server, the first identifying tag to determine whether the first identifying tag has been used;
creating, by the server upon determining the first identifying tag has not been used, an anonymous user account incorporating the first identifying tag;
logging, by the server, the user into a session of the server using the anonymous user account;
disconnecting the session associated with the anonymous user account;
storing, upon disconnection of the session, the first identifying tag and information about a state of the session;
receiving, by the server, a second anonymous request from the user for login, the second request comprising the identification number;
creating, by the server in response to receiving the second request, a second identifying tag comprising at least a part of the identification number;
comparing the second identifying tag with the first identifying tag of the disconnected session; and
reconnecting the user to the disconnected session and the anonymous user account responsive to the comparison.

2. The method of claim 1, further comprising retrieving data from the client.

3. The method of claim 1, further comprising:
determining the first identifying tag is not valid; and
associating in response to the determination the first identifying tag with a generic name.

4. The method of claim 1, wherein creating a first identifying tag further comprises creating a first identifying tag having an alphanumeric string.

5. The method of claim 1, further comprising validating a name of the created user account.

6. The method of claim 1, wherein comparing the second identifying tag with the first identifying tag further comprises comparing the tags using one of: string comparison, regular expression comparison, numerical equivalence, and comparison using content of the identifying tag.

7. The method of claim 1, wherein reconnecting further comprises reconnecting the disconnected session after determining the disconnected session is not stale.

8. The method of claim 1, wherein storing information on the state of the session further comprises storing information comprising: information about applications executing when the session disconnected; a list of open files; and file transfer status information.

9. The method of claim 1, wherein receiving the first request comprising the identification number further comprises receiving the first request comprising an identification number of a smartcard.

10. A system for distinguishing between sessions associated with anonymous users, the system comprising:
a client computing device; and
a server:
receiving, from the client computing device, a first anonymous request from for login by a user, the first request comprising an identification number,
creating a first identifying tag in response to receiving the request, the first identifying tag comprising at least a portion of the identification number,
validating the first identifying tag to determine whether the first identifying tag has been used,
creating, upon determining the first identifying tag has not been used, an anonymous user account incorporating the first identifying tag,
logging the user into a session of the server using the anonymous user account,
disconnecting the session associated with the anonymous user account,
storing, upon disconnection of the session, the first identifying tag and information about a state of the session,
receiving, from the client computing device, a second anonymous request from the user for login, the second request comprising the identification number;
creating, in response to receiving the second request, a second identifying tag comprising at least a part of the identification number;
comparing the second identifying tag with the first identifying tag of the disconnected session; and
reconnecting the user to the disconnected session and the anonymous user account responsive to the comparison.

11. The system of claim 10, wherein the server retrieves data from the client computing device.

12. The system of claim 10, wherein the server determines the first identifying tag is not valid, and associates, in response to the determination, the first identifying tag with a generic name.

13. The system of claim 10, wherein the server creates a first identifying tag comprising an alphanumeric string.

14. The system of claim 10, wherein the server validates a name of the created user account.

15. The system of claim 10, wherein the server compares the second identifying tag with the first identifying tag by using one of: string comparison, regular expression comparison, numerical equivalence, and comparison using content of the identifying tag.

16. The system of claim 10, wherein the server reconnects the disconnected session after determining the disconnected session is not stale.

17. The system of claim 10, wherein the information on the state of the session comprises: information about applications executing when the session disconnected; a list of open files; and file transfer status information.

18. The system of claim 10, wherein the identification number comprises an identification number of a smartcard.

* * * * *